June 29, 1943.   W. H. FRANK   2,322,799
BUS DUCT SYSTEM
Filed Dec. 23, 1940   2 Sheets-Sheet 1

INVENTOR.
William H. Frank
BY Daniel G. Cullen

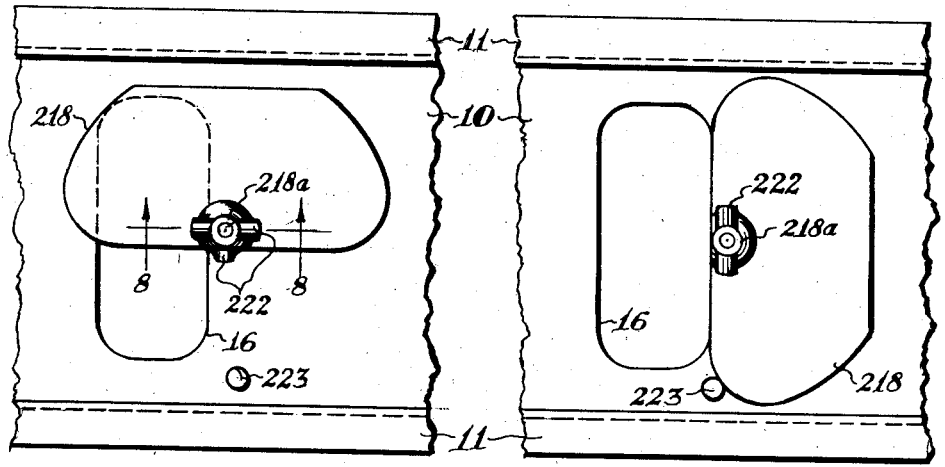
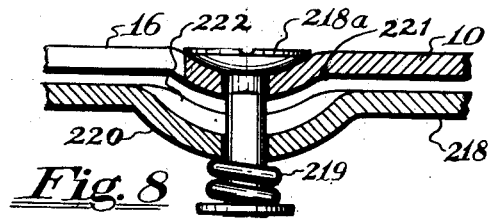
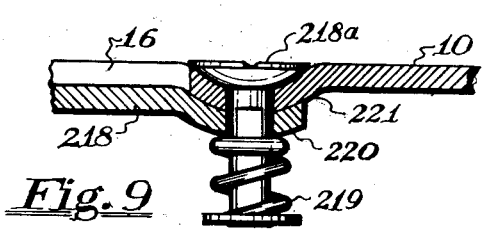
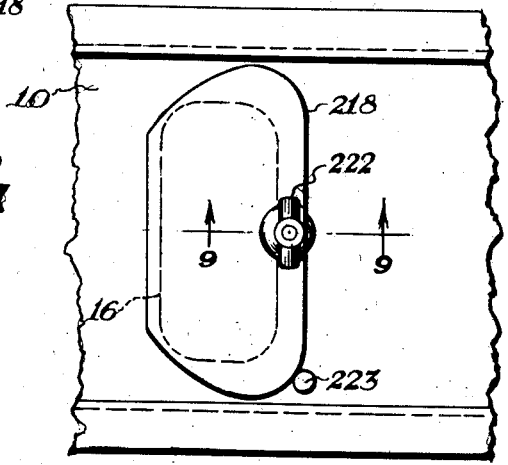

Patented June 29, 1943

2,322,799

UNITED STATES PATENT OFFICE 2,322,799

BUS DUCT SYSTEM

William H. Frank, Detroit, Mich., assignor to Bulldog Electric Products Company, Detroit, Mich., a corporation of West Virginia Application December 23, 1940, Serial No. 371,319

6 Claims. (Cl. 173—334.1)

This application relates to electrical distribution systems of the bus duct type. Bus duct systems have been known before. This application relates specifically to improvements in bus duct systems, and is a continuation in part of a prior application, Serial No. 301,048, filed October 24, 1939.

A bus duct system of the character under consideration, as shown in my prior application, Serial No. 239,937, filed November 12, 1938, employs branch circuit take-off devices, commonly known as plugs, having prongs for engaging the bus bars. For insulating the openings through which the plug prongs are inserted, at such openings, there are provided hollow blocks or insulators through which the bus bars pass and having openings or wells through which the plug prongs pass, the openings being sealed from the inside of the duct except where they intercept the openings through which the bus bars pass. In this way, prongs inserted into the duct through the prong openings of the insulators are sealed from the inside of the duct. The insulators are stationary and are provided with slidable shutters for the duct openings.

One feature of the invention hereof is the provision of a rotatable slidable shutter in such systems.

Two different shutter arrangements are here shown, one of them being that shown in a prior application, Serial No. 301,048, filed October 24, 1939, and the other being an improvement on that arrangement.

The two embodiments are shown in the appended drawings. In these drawings,

Figs. 5, 6 and 7 are inside views of a fragment of duct casing showing an improved shutter arrangement in partly open, full open and full closed positions, respectively;

Figure 1:
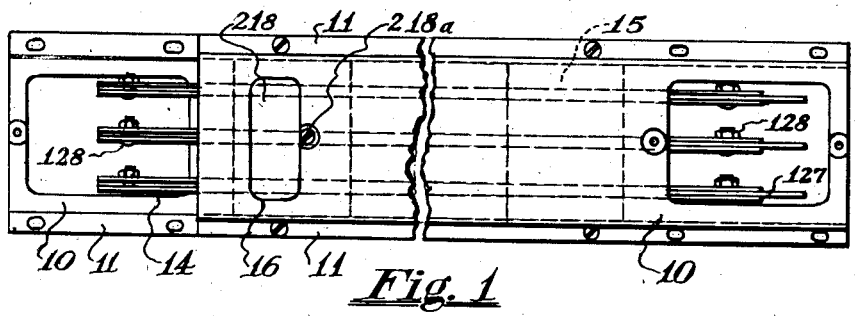
Fig. 1 shows a stationary insulator system wherein the shutters are rotatably slidable.

Figs. 8 and 9 are transverse sections as if on lines 8—8 and 9—9 of Figs. 5 and 7 respectively.

The electrical distribution system herein disclosed employs sheet metal casing halves 10 of equal length. They have cooperating longitudinal edge flanges 11 through slotted holes of which pass casing joining bolts. Splices between sections are effected by means of lap scarf joints, utilizing these bolts.

Within the duct formed by the casing halves are bus bars 14 of hollow, U cross section, and these are insulatedly supported in the duct by means of the insulators 15, some of which are below the bus bars and some of which are above, as shown. The insulators are positioned adjacent the plug prong holes 16 which are longitudinally spaced and staggered and are disposed on opposite sides of the casing. Each insulator has a grooved surface whose grooves 17 receive the bus bars, these being so proportioned with respect to the grooves that when they are seated in the grooves, practically all of a bus bar at an insulator except one edge, either the bight or the open side, is closely surrounded by the wall of the groove.

Each insulator is provided with a plurality of bores 19 aligned with the bus bars 14 and through which access may be had for engagement of the bus bars, engagement being effected by means of plug prongs, not shown, which enter the bus bars through bight slots 56 or through the open sides of the bus bars.

Splices between bus bars may be effected by means of the notched splicing bars 127, these receiving set screws 128 whereby a firm splice may be effected.

In this system, between each stationary insulator, and the adjacent duct wall having an opening 16 is a sheet metal shutter plate 218 mounted on and keyed to a pivot bolt 218a and disposed near the opening 16. Each plate 218 may be rotated around its pivot axis, by turning the pivot, for closing or exposing the adjacent plug prong hole 16. Swivel pin 218a is fitted into a dimple 218b of the duct and shutter, which are in turn seated in a depression 218c in the block to prevent the block from sliding with respect to the duct.

Figure 2:
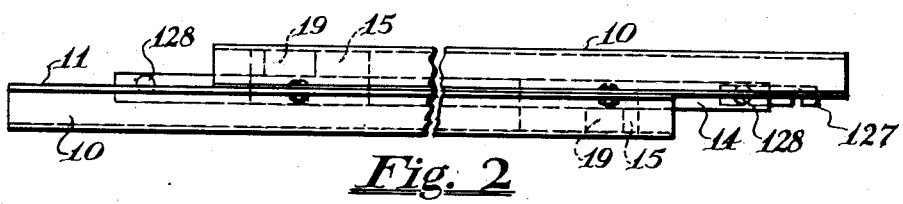
Fig. 2 is another view of the system of Fig. 1.
Figure 3:
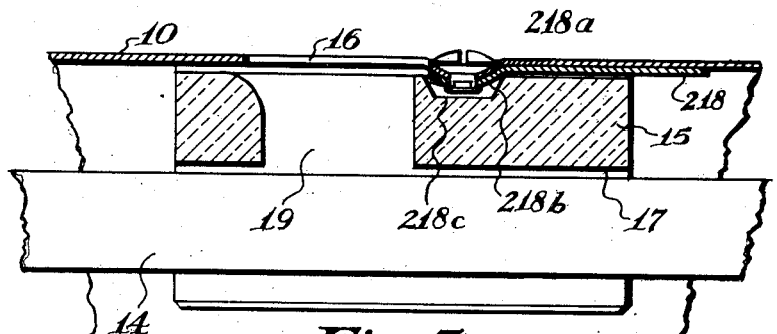
Fig. 3 is a fragmentary section showing details of the rotatably slidable shutter.
Figure 4:
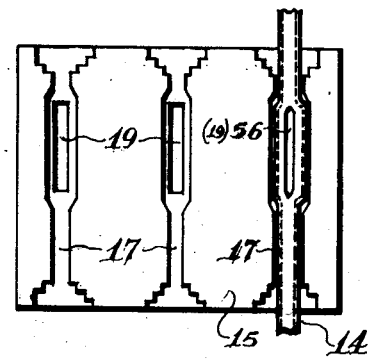
Fig. 4 shows the insulator and bus bar.

The improved shutter arrangement shown in Figs. 5-9 inclusive resembles that of Figs. 1-4, varying therefrom slightly, however, in a manner that will now be described.

A coiled spring 219 is disposed between a dimple 220 of the shutter 218 and the headed end or washer of the rivet 218a. Cooperating with the shutter dimple 220 is a dimple 221 of the duct. Each of the dimples 220—221 have transverse ribs 222, so that during shutter movements, the ribs will nest and thus index shutter movement to determine full open or full closed position.

A small dimple 223 formed on the duct provides a stop against excessive movement of the shutter in the opening or closing direction.

The cooperation of the ribs 222 is as follows: When the shutter is in full closed or full open position the ribs 222 of the shutter dimple will nest with the ribs 222 of the duct dimple. However, when the shutter is in an intermediate position, as in Fig. 5, the ribs 222 of the shutter will not nest with the ribs 222 of the duct and instead ribs 222 of the duct will engage the unribbed portion of the dimple of the shutter to space the shutter slightly away from the duct, compressing the spring 219, and thus reducing the friction surface between the shutter and the duct during shutter movement.

Now having described the improvements herein disclosed, reference should be had to the claims which follow for a determination of the inventions sought to be protected herein.

I claim:

1. A bus duct and plug type electrical distribution system comprising a duct containing a longitudinally extending bus bar and having a hole providing access to the bus bar through which may be inserted a bus bar engaging plug prong, and means for supporting the bus bar, comprising an insulating block within the duct, cooperating formations of the duct and block preventing relative longitudinal shifting of the duct and block, the formation of the duct comprising an inwardly projecting embossment, the formation of the block comprising an inset recess containing the embossment, the duct having a shutter for said hole, a bolt in said embossment for supporting the shutter, which is disposed between the block and the adjacent duct wall to rotate in the space between them in its own plane on the bolt as an axis.

2. A bus duct and plug type electrical distribution system comprising a duct containing a longitudinally extending bus bar and having a hole providing access to the bus bar through which may be inserted a bus bar engaging plug prong, and means for shielding the prong and supporting the bus bar, comprising a prong shield in the form of an insulating block within the duct and disposed at said hole, and having on its interior end a slot for receiving a bus bar therein, the shield being hollow to provide a prong way or well therein which opens at its interior end into the slot and at its other end to the ambient atmosphere, at a point outside the duct, the slot permitting the shield to be assembled with respect to the bus bar by disposing the bus bar in the slot of the shield, cooperating formations of the duct and block preventing relative longitudinal shifting of the duct and block, the formation of the duct comprising an inwardly projecting embossment, the formation of the block comprising an inset recess containing the embossment, the duct having a shutter for said hole, a bolt in said embossment for supporting the shutter, which is disposed to rotate in its own plane on the bolt as an axis.

3. In a shutter arrangement for a casing wall having an opening, a shutter for said casing, a rivet keyed to the shutter and projecting through a hole of the wall and having a manipulable head outside the casing, the shutter and the wall having inwardly projecting nesting dimples at and receiving the rivet, the dimples being cooperatively ribbed for indexing shutter rotation and for spacing the shutter from the wall during shutter rotation, and a spring tending to bias the shutter towards the wall.

4. A bus duct and plug type electrical distribution system comprising a duct containing a longitudinally extending bus bar and having a hole providing access to the bus bar through which may be inserted a bus bar engaging plug prong, and means for supporting the bus bar, comprising an insulating block within the duct cooperating formations of the duct and block preventing relative longitudinal shifting of the duct and block, the formation of the duct comprising an inwardly projecting embossment, the formation of the block comprising an inset recess containing the embossment, the duct having a shutter for said hole, a bolt in said embossment for supporting the shutter.

5. A bus duct and plug type electrical distribution system comprising a duct containing a longitudinally extending bus bar and having a hole providing access to the bus bar through which may be inserted a bus bar engaging plug prong, and means for shielding the prong and supporting the bus bar, comprising a prong shield in the form of an insulating block within the duct and disposed at said hole, and having on its interior end a slot for receiving a bus bar therein, the shield being hollow to provide a prong way or well therein which opens at its interior end into the slot and at its other end to the ambient atmosphere at a point outside the duct, the slot permitting the shield to be assembled with respect to the bus bar by disposing the bus bar in the slot of the shield, cooperating formations of the duct and block preventing relative longitudinal shifting of the duct and block, the formation of the duct comprising an inwardly projecting embossment, the formation of the block comprising an inset recess containing the embossment, the duct having a shutter for said hole, a bolt in said embossment for supporting the shutter, which is disposed between the block and the adjacent duct wall to rotate in the space between them in its own plane on the bolt as an axis.

6. In a shutter arrangement for a casing wall having an opening, a shutter inside said casing, a rivet keyed to the shutter and projecting through a hole of the wall and having a manipulable head outside the casing, the shutter and the wall having inwardly projecting nesting dimples at and receiving the rivet, the dimples being cooperatively ribbed for indexing shutter rotation and for spacing the shutter from the wall during shutter rotation, and a spring tending to bias the shutter towards the wall.

WILLIAM H. FRANK.